Inventor:
Egon Frank

Jnventor:
Egon Frank

Nov. 24, 1964 E. FRANK 3,158,690

FM TIME DIVISION MULTIPLEX SYSTEM HAVING INPUTS SUPERIMPOSED WITH POSITIVE AND NEGATIVE D.C. VOLTAGES

Filed April 3, 1961 3 Sheets-Sheet 3

Jnventor:
Egon Frank

United States Patent Office 3,158,690

Patented Nov. 24, 1964

3,158,690

FM TIME DIVISION MULTIPLEX SYSTEM HAVING INPUTS SUPERIMPOSED WITH POSITIVE AND NEGATIVE D.C. VOLTAGES

Egon Frank, Berlin-Mariendorf, Germany, assignor to Loewe Opta Aktiengesellschaft, Berlin, Germany, a company of Germany Filed Apr. 3, 1961, Ser. No. 100,475
Claims priority, application Germany, Apr. 6, 1960, L 35,831
6 Claims. (Cl. 179—15)

Figure 1:
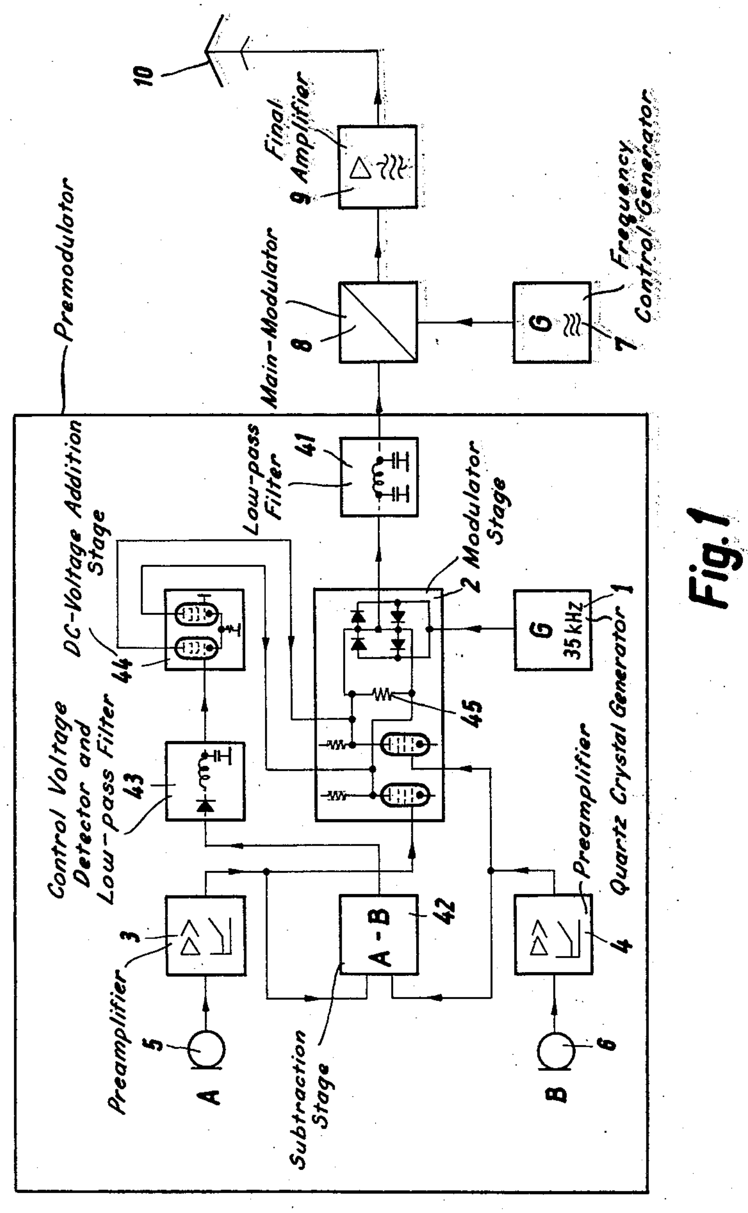

The subject matter of the present invention is directed to an advantageous further development of the FM transmission system described in applicant's United States Patent No. 3,099,715, filed on June 20, 1960, with two audio signals on a common high frequency carrier according to the time multiplex system for compatible two-channel stereophonic transmission according to which at the transmitting side by means of a special stereophonic premodulator the FM modulator is supplied with the first LF signal together with a superimposed positive direct voltage and then with the second LF signal together with a superimposed negative direct voltage in turn in supersonic frequency rhythm and with a variable switching pulse amplitude. The present invention develops this special FM transmission system for compatible two-channel stereophonic transmission so that it satisfies to the highest possible extent the latest requirements for practical operation in all the important points.

In the course of the commenced research, it was established that out of all the demands made on the stereophonic transmission systems in question, there were three chief conditions which had to be brought into a favourable relationship and these are:

(1) The compatible $(A+B)$ portion of the signal (sum signal) has to be reduced to the smallest possible extent in comparison to the conventional mono-channel modulation.

(2) The interference spectra arising from any subcarrier portion in its channel, especially in the two adjacent channels, channels must be reduced to a minimum.

(3) The outlay at the receiving end should be kept as low as possible.

The transmission system of this kind developed by the applicant in United States Patent No. 3,099,715, filed on June 20, 1960, has the especially important advantage of extremely small outlay at the receiving side, but it can be considered a disadvantage that the compatible $(A+B)$ signal can attain in the maximum case 50% of that amplitude attainable with mono-channel normal modulation, and that as a result normal mono-channel receivers suffer a loss in signal amplitude of this magnitude, whereby particularly in the boundary areas of the transmitting zone of the transmitter an undesirable loss in volume can possibly occur. At the same time, as measurements of transmission propagation have shown, the share of subcarrier amplitude is a disturbing factor owing to the difference and combination of frequencies thereby arising with transmitters working in this or in the adjacent channels, particularly so when these transmitters likewise transmit multiplex modulations.

Accordingly, the present invention suggests an increase in the $(A+B)$ signal portion with the present FM transmission system and at the same time a control of the occurring $(A-B)$ portion containing the stereophonic signal in its amplitude solely dependent on the argument that the subcarrier disappears completely when e.g. there are no $(A-B)$ components. In the invention, the reduction of the $(A-B)$ portion is achieved in a particularly advantageous and simple manner for example by the stereophonic pre-modulator before the conversion which with the present method brings about the subcarrier and derives the amplitude of the subcarrier from the respective difference of the single signal voltage, and artificial cross-talk is brought about between the signal portions A and B, the proportion of which at the same time determines the reduction factor of the subcarrier. In addition an increase in the carrier amplitude occurs, dependent on the respective signal amplitudes, now in the cases when a momentary difference arises between the two A and B signal voltages due to the appearance of a stereophonic signal $(A-B)$. This means that with identical voltage passage in the two channels, that is with control of the two channels by cohering, co-phasal signals of the same amplitude, the subcarrier disappears completely. Likewise, the subcarrier disappears at no-load when neither of the two LF signals are present.

The reduction of the maximum possible portion of the subcarrier results at the same time in the important possibility of further modulating the compatible portion $(A+B)$ more than is possible with the embodiments of the above-mentioned earlier transmission system of the applicant according to the United States Patent No. 3,099,715.

The subject matter of the present invention also requires the automatic carrier regulation to be set up so that it avoids an overlapping of the two envelope curves in every modulation case arising, since in this case distortions would occur owing to the non-operation of the diodes in the receiver stereophonic demodulator. Accordingly, the control voltage is produced in that a control signal is produced solely proportional to the $(A-B)$ amplitude value from the two input signals A and B in a substraction stage and, after rectification and removal of all LF residues by the use of additional low pass filter chains, this signal controls two auxiliary valves which effect an amplification and coupling with the polarity—opposite in the two channels—of the direct voltage components one of which is superimposed on the A signal and the second on the B signal before conversion.

In this connection, a special advantage of the signal preparation of the present system by means of conversion of the A and B signal portions specially on regulation of the carrier amplitude lies in the fact that, at least at the transmitting end, there are no envelope distortions at any desired high degree of modulation whilst with the conventional AM modulation method, this is unavoidable on approaching the 100% modulation degree.

In order to obtain that no inadmissible distortions can arise in the receiving diodes of the stereophonic demodulator in accordance with the bend in the characteristic curve of only limited sharpness at the points of the smallest subcarrier voltage, the subject matter of the invention also provides that the subcarrier is not made equal to zero at the minimum points and at no-load but has a value of 5 to 10% of the maximum amplitude which at first with increasing modulation can remain constant until the minimum points have only about 3 to 5% of the permissible maximum amplitude. At this point, the threshold of operation for the beginning of the regulating effect is reached and with increasing $(A-B)$ signal amplitude the subcarrier is increased proportional to the $(A-B)$ signal value so that the subcarrier amplitude cannot at any point exceed the suggested value of about 3 to 5% of the maximum amplitude. In this case, the minimum voltage at the receiving end on the diodes of the stereophonic demodulator is so large that a linear rectification is always assured.

Further details of the transmission system according to the invention are explained on the basis of the diagrams.

Figure 2:
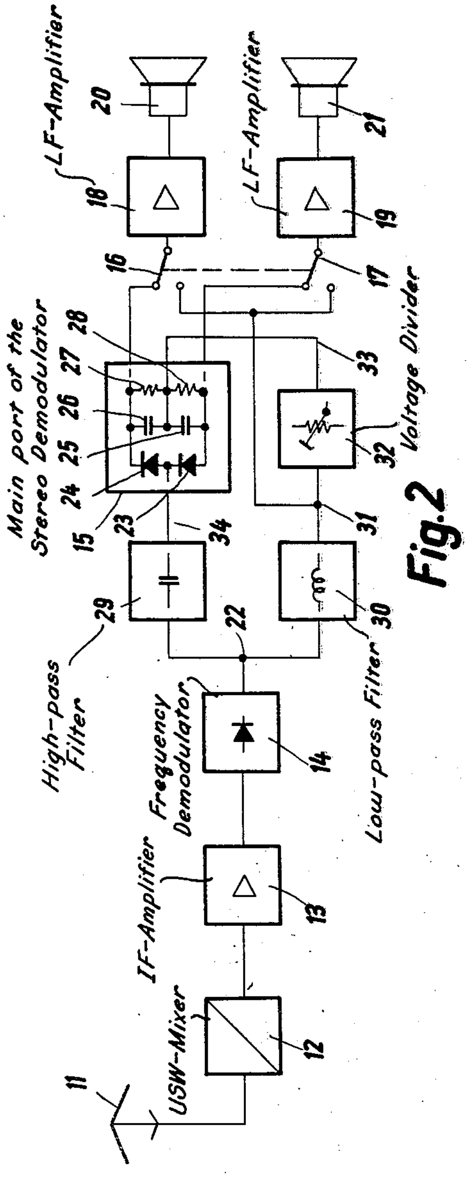
Figure 3:
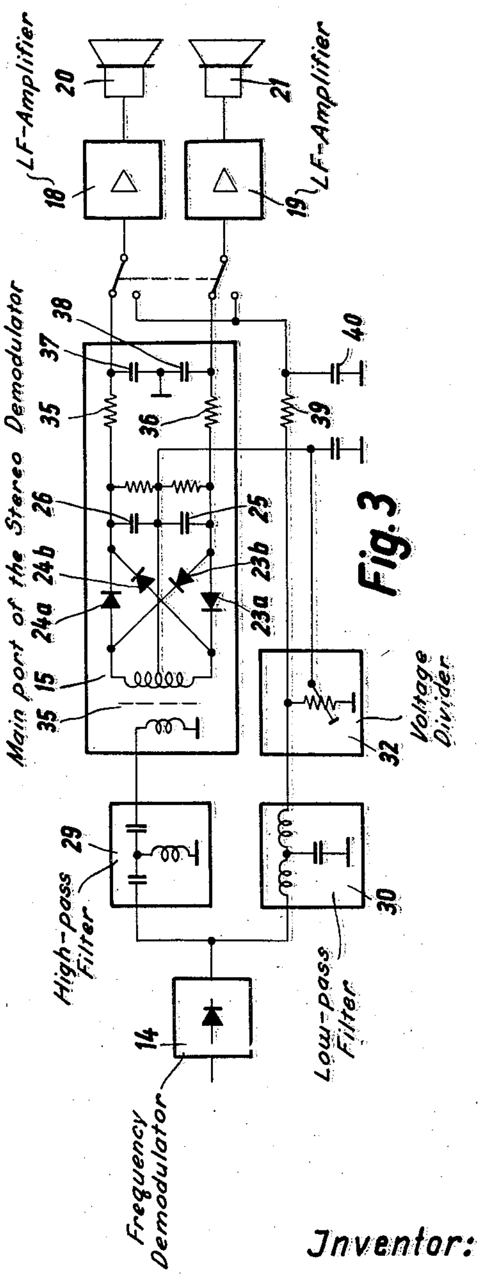
Figure 4:
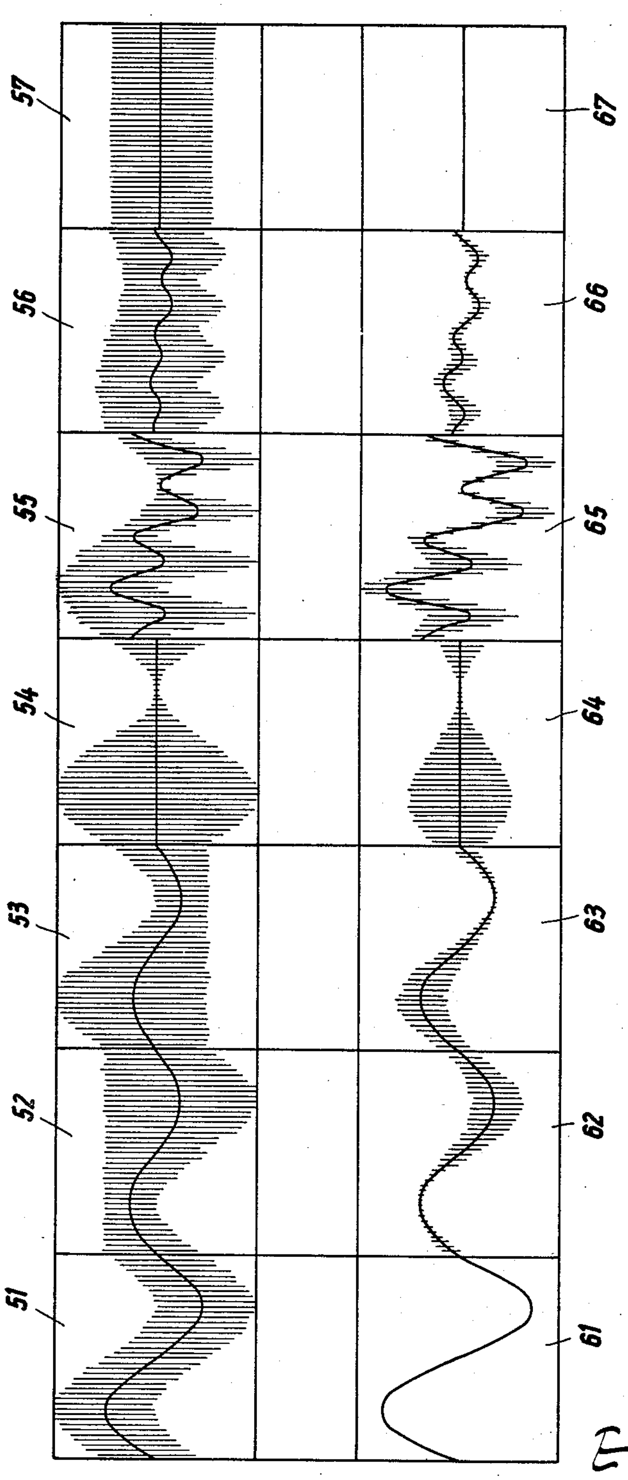

These diagrams show:

FIG. 1 the block circuit diagram of the whole transmitting layout,

FIG. 2 the block circuit diagram of the whole receiver,

FIG. 3 another block circuit diagram for the arrangement at the receiving end, in particular in view of the arrangement of the stereophonic demodulator, FIG. 4 special characteristic modulation cases of the two types of systems, namely of the system of the invention and the prior system of the applicant whereby it is possible to make an immediate quantitative comparison both of the amplitude ratio for the (A+B) signal and also of the amplitude ratio of the switching carrier.

In FIGS. 1, 5 and 6 are the two signal sources (for example microphones) in which the signals A and B are produced which are each fed to a pre-amplifier 3 and 4 respectively which contain as required the usual pre-emphasis networks for FM purposes. The output of these two pre-amplifiers is fed to the modulator stage 2 of the pre-modulator at the input of which for example a pentode each is used with its anode circuit containing a dynamic resistance.

The signal voltages each arising in the two anode resistances are fed to a conversion device consisting in the example shown of a set of four diodes which are controlled by a quartz crystal generator 1 in the rhythm of the desired subcarrier frequency. The output of the modulator stage 2 of the pre-modulator is freed from all harmonics of the subcarrier frequency via a multi-stage low pass filter section 41 and conducted practically in pure sine form to the FM main modulator 8 with its frequency control generator 7 producing the desired, preferably, USW carrier frequency. The output of the modulator 8 operates in the usual way on a final amplifier 9 and its output in turn on the transmitting aerial 10.

According to the invention, in the modulator stage 2 of the pre-modulator between the anodes of the two input pentodes, a resistance 45 is inserted which effects the cross-talk at the transmitting end. As a result, the alternating potential differences between the two anodes in relationship to this resistance are decreased to the values of the two anode resistances and so the subcarrier amplitude is reduced to the same extent. In addition, the invention provides for a substraction stage 42, the input of which is controlled by the two pre-amplifiers with the respective difference between the two signals appearing on its output. In turn, this difference signal is rectified in part 43 and, on removal of the LF portions by means of low pass filter chains fed to part 44. Part 44 contains two auxiliary valves, e.g. pentodes which effect an amplification and addition of the direct voltage components of opposite polarity with the two LF signals. The anode of each auxiliary valve of part 44, for example, effects, by means of direct connection with one anode each of the input valves of the main part 2 of the pre-modulator, a superposing of the opposed direct voltages with the two LF signals A and B which are then in the diode conversion device already mentioned of the pre-modulator 2 fed alternatively in time to the FM modulator 8. The flow of the control voltage for the direct voltage component in part 44 is adjusted by a special control unit (not shown) exactly proportional to the respective difference value $(A-B)$ to such an amount that an overlapping of the envelopes after conversion is just avoided.

FIG. 2 shows the schematic circuit arrangement at the receiving end. The received signals pass from the aerial 11 via the USW mixing section 12 and the adjacent IF amplifier 13 to the normal FM demodulator 14, for example a ratio detector. The circuit divides into two circuit branches behind the output 22 of the FM demodulator 14. In the upper circuit branch, the oscillations pass via a high pass filter 29 to the main part 15 of the stereophonic demodulator which in the simplest case as shown consists of two opposite poled diode AM demodulators each formed from a diode 23 and 24 respectively, a collector condenser 25 and 26 respectively and a load resistance 27 and 28 respectively. The other circuit branch pass via a low pass filter 30 the output of which is connected to a voltage divider 32 which in turn conducts an adjustable portion of this voltage via lead 33 to the RC centre of the diode AM demodulators mentioned in the other circuit branch. By means of this arrangement, in the two output leads of the stereophonic demodulator which are conducted via the two switches 16 and 17 each to a LF amplifier 18 and 19 and a speaker arrangement 20 and 21 in the known manner, the original A and B signal again arise. This results owing to the series connection of the $(A+B)$ signal at the output of 32 with the two equal sized stereophonic components in 180° phase opposition obtained from the (A−B) signal portion in the main part 15 of the stereophonic demodulator. So as to bring the cross-talk of the two channels to zero or to a minimum, it is only necessary to make an exact adjustment of the voltage divider 32 to a critical fraction of the $(A+B)$ signal portion. The arrangement in the form shown also permits undistorted transmission from normal FM modulation (mono-operation) without any change-over. However, in order to avoid voltage loss in the voltage divider 32 during mono-operation, if desired, a parallel connection of the two LF channels to point 31 before the voltage divider can be made by means of the two coupled switches 16 and 17.

In comparison, FIG. 3 shows another embodiment for the arrangement at the receiving end with a specially formed main part 15 of the demodulator. With retention of the circuit elements 14, 29, 30 and 32, part 15 is constructed differently. The fundamental idea here is to compensate for the loss in $(A-B)$ signal amplitude due to the reduction on the subcarrier amplitude by good power matching of the main part 15 to the FM demodulator 14. This can, for example, be brought about by use of a matching transformer 35 with suitable step-up ratio and by use of full wave rectification for the two rectifying branches using the four diodes 23*a*, 23*b*, 24*a*, 24*b*. As a result, a subcarrier frequency doubling results at the same time which makes possible a better integration of the rectified voltage with help of the charging condensers 25 and 26 in that a better approximation to the peak voltage value is brought about. In addition, the doubled subcarrier frequency brings about a considerably better approximation to the envelope forms in the whole range of the signal frequency, but in particular at the higher frequencies. For reasons of completeness, the necessary de-emphasis networks are shown in this circuit example, which with stereophonic operation consist of the parts 35, 36, 37, 38 and with mono-operation of the parts 39 and 40, and which effect at the same time a filtering of the subcarrier residues apart from the response curve linearization.

With the stereophonic demodulators shown in FIG. 2 and FIG. 3, the output level in the case of stereophonic operation is normally still smaller than with mono-operation. In certain cases, therefore, especially with low amplification reserve in the LF amplifiers, it is advantageous to insert after each of the two stereophonic demodulator outputs a voltage amplifier which should best have such a degree of amplification that on stereophonic operation, volume level matching to mono-operation takes place during stereophonic operation. This results in another advantage, namely that with the same adjustment of the volume control, the same high and low emphasis is obtained for stereophonic operation, too, owing to the physiological tone control practically always present and thereby a complete matching of volume and tone is achieved in both kinds of operation.

FIG. 4 shows especially characteristic examples oscillographically for the completely prepared multiplex signal before the FM modulator 8 (FIG. 1) and behind the FM demodulator, point 22 (FIG. 2) respectively with the top row showing the multiplex signal prepared according to applicant's prior method with the oscillograms 51 to 57 and the bottom row 61 to 67 showing the same modulation cases according to the present system of the invention. In both groups, the scale for the oscillograms is the same. The top and bottom parallel lines represent the utmost permissible modulation amplitude for each system. The drawn lines of the curves correspond to the compatible signal portion $(A+B)$ whilst the vertical hatched area presents the superimposed $(A-B)$ sub-carrier portion. It is immediately obvious that in all the oscillograms of the bottom row (i.e. of the invention), the compatible portion, provided it is not zero (54, 57, 64, 67) is always greater than in the top row by the factor 1.5 in accordance with the proportion mentioned of the $(A+B)$ portion of 50% as a maximum in the United States Patent No. 3,099,715 and 75% respectively as a maximum in the present invention. Likewise the portion of the superimposed subcarrier amplitude is considerably smaller in all cases on the bottom row or in cases 61 and 67 zero. In particular, the oscillograms correspond to the following cases:

Oscillogram 51 resp. 61: pure mono-signal of full amplitude and two cohering, co-phasal, equal-sized signal portions A and B of semi-amplitude; respectively Oscillogram 52 resp. 62: signal A is zero;

Oscillogram 53 resp. 63: signal B is zero;

Oscillogram 54 resp. 64: cohering, anti-phasal and equal-sized signals. Here the $(A+B)$ portion is equal to zero;

Oscillogram 55 resp. 65: channel A and B with different frequencies fully modulated;

Oscillogram 56 resp. 66: channel A and B with different frequencies each modulated ¼ in comparison to 55 resp. 65;

Oscillogram 57 resp. 67: no-load in both channels with the subcarrier appearing with 50% of the maximum possible amplitude in 57 whilst in 67 the subcarrier disappears completely.

In the arrangement of the invention with pure mono-operation, i.e. with no $(A-B)$ signal portion, the modulation of the $(A+B)$ signal portion is fixed at a maximum value of 75% of the permissible total modulation (see diagram 61 in FIG. 4). Accordingly, a suddenly occurring stereophonic component can also not bring about any exceeding of maximum permissible frequency modulation peak. However, in view of the fact that statistically the $(A-B)$ components occur on an average with small amplitudes and relatively seldom with concert type broadcasts but not with effect broadcasts, the modulation range of the $(A+B)$ value can be extended in principle to 100% provided an automatic level reduction device is provided in or before the two amplifier branches 3 and 4 to act as soon as a stereophonic signal, i.e. an $(A-B)$ signal portion appears. The control voltage (cf. 42, 43 in FIG. 1) provided for the subcarrier amplitude control and derived from the $(A-B)$ signal is then best used at the same time to control also the necessary input level reduction up to 25%. For this purpose, the two preamplifiers 3 and 4 are made adjustable or additional limiting amplifiers inserted before these amplifiers 3 and 4. Finally, the automatic limiting amplifiers often already used in practice before the amplifiers 3 and 4 can be controlled together with the control voltage behind the circuit member 43 (cf. FIG. 1) for the purpose mentioned.

It is essential that this control procedure for reducing the maximum input level is only effective when an $(A-B)$ signal, i.e. a stereophonic component, occurs. In this case, the amplification reduction is made in each case only proportional to the momentary $(A-B)$ value. The input amplification is then reduced at the most from 100% to 75% and thereby the modulation range for the $(A+B)$ value again brought to the same value of 75% of the permissible total modulation range, as is provided in the embodiment of the invention without automatic input amplification regulation.

What I claim is:

1. In a frequency modulation transmission system using two low-frequency signals on a common high frequency carrier according to the time multiplex system for compatible two-channel stereophonic transmission, comprising a transmitter and at least one receiver, said transmitter having a stereophonic pre-modulator, containing a frequency modulator and means for switching in turn in supersonic frequency the first low-frequency signal representing the left audio information with a superimposed positive direct voltage and then the second low-frequency signal representing the right audio information with a superimposed negative direct voltage to said frequency modulator using a variable sub-carrier amplitude, means for increasing the sum signal portion of both said low-frequency signals and of reducing the difference signal portion of both said low-frequency signals enabling to form the stereophonic signal in comparison to the amplitude of the sub-carrier and of the compatible sum signal portion which both are equal-sized in amplitude in case of modulation with identical low-frequency signals for left and right audio information, and further means for controlling the sub-carrier in its respective amplitude solely proportional to the difference signal value so that the sub-carrier likewise completely disappears when the difference signal components are completely missing.

2. In a frequency modulation transmission system as claimed in claim 1, said receiver having two low-frequency channels in which a stereophonic demodulator is fitted between the frequency demodulator and the two low-frequency channel inputs for the purpose of separation into the two original low-frequency signal portons, this demodulator consisting in the simplest case of two opposite poled diode AM demodulators, and its diode centre connected via a high pass filter, and its RC centre via a voltage divider, and a low pass filter to the frequency demodulator output.

3. In a frequency modulation transmission system as claimed in claim 1 said transmitter comprising means for the automatic amplitude regulation of the sub-carrier, said means consisting of a substraction stage controlled by the two low-frequency input signals producing a control signal proportional only to the respective maximum difference value of said low-frequency input sgnal by means of a subsequent rectifier with afterconnected filter chains, a D.C.-voltage producing stage connected to said rectifier and filter chain which is thus connected as to produce two variable direct voltages of the same magnitude but with opposed polarity in accordance with the signals of said substraction stage, further means connected to the output of said D.C.-voltage producing stage for superimposing said two D.C.-voltages on the signal for the left audio information and on the signal for the right audio information, and means for conducting both said superimposed signal groups to the afterconnected modulator.

4. In a frequency modulation transmission system using two audio signals on a common high-frequency carrier according to the time multiplex system for compatible two-channel stereophonic transmission, in combination at the transmitter side a pair of microphones for producing two low-frequency signal groups representing the left and right audio information, a pair of preamplifiers, a substraction stage, a control voltage detector including a low-pass filter, a D.C.-voltage addition stage, a modulator stage, a generator for producing the sub-carrier, a further low-pass filter, a main modulator together with a frequency control generator for producing the carrier wave, and a final amplifier, said subtraction stage being connected with its input via each of said preamplifiers to said microphones and with its output via said control voltage detector including said low-pass filter and said D.C.-voltage addition stage to the input of said modulator stage, said modulator is also connected to said pre-amplifiers, said modulator stage, containing two separate channels for conducting said low-frequency signals for left and right audio information respectively, being supplied with a cross-talk resistance connecting said channels, said modulator stage being further supplied with a diode switching circuit arrangement for producing in combination with said generator for the subcarrier the multiplex signal, which is further connected via said further low-pass filter to said main-modulator and said amplifier.

5. In a system for receiving two audio signals on a common high-frequency carrier according to the time multiplex system for compatible two-channel stereophonic transmission, wherein the sum signal of the two audio signals is transmitted in one channel and a subcarrier modulated with a difference signal is transmitted in the other channel, a mixing stage, an intermediate frequency amplifier connected to said mixing stage, a frequency demodulator following said intermediate frequency amplifier, means for dividing the circuit-connection into two branches behind the output of said demodulator, one of said branches consisting of a high-pass filter for transmitting said subcarrier and an afterconnected main-part of the stereo-demodulator, the other of said two branches consisting of a low-pass filter for transmitting said sum signal and afterconnected voltage divider, further means for conducting the two signal groups of said two branches representing the left and right audio informations respectively to separate low-frequency amplifiers and afterconnected loud-speakers, said main-part of the stereo-demodulator consisting of two opposite poled diodes, two condensers and two load resistances, each pair of said diodes, condensers and resistances being connected in series, said series connected pairs of elements being connected in parallel to each other, the connection point of said diodes being connected to said preceding high-pass filter, the connection point of said condensers and said load resistances being connected to each other and further connected to the output of said voltage divider, the connection points of the free ends of said parallel connected pairs of elements forming the output of said stereo-demodulator being connected to said further means for connecting said output to said separate low-frequency amplifiers, said latter means comprising a pair of switches which are selectively connected to said stereo-demodulator output and to the connection point of said low-pass filter and said voltage divider input respectively.

6. In a system for receiving two audio signals on a common high-frequency carrier according to the time multiplex system for compatible two-channel stereophonic transmissions, wherein the sum signal of the two audio signals is transmitted in one channel and a subcarrier modulated with a different signal in transmitted in the other channel, a mixing stage, an intermediate frequency amplifier connected to said mixing stage, a frequency demodulator following said intermediate frequency amplifier, means for dividing the circuit-connection into two branches behind the output of said demodulator, one of said branches consisting of a high-pass filter for transmitting said subcarrier and an afterconnected main-part of the stereo-demodulator, the other of said two branches consisting of a low-pass filter for transmitting said sum signal, an afterconnected voltage divider, and a deemphasis network, further means for conducting the two signal groups of said two branches representing the left and right audio informations respectively to separate low-frequency amplifiers and afterconnected loud-speakers, said main part of the stereo-demodulator consisting of a matching transformer, a full-wave rectifier arrangement, two condensers, two load resistances, and a deemphasis network, said full-wave rectifier arrangement consisting of four diodes, each pair of said condensers and said load resistances being connected in series, said series connected pairs of elements being connected in parallel to each other, and to the output of said full-wave rectifier arrangement, the input of said rectifier arrangement being connected to the output of said matching transformer, the connection point of said condensers and load resistances being connected to each other and further connected to the output of said voltage divider, the connection points of the free ends of said parallel connected pairs of elements forming the output of said stereo-demodulator being connected via said deemphasis network to said further means for connecting said stereo-demodulator output to said separate low-frequency amplifiers, said latter means comprising a pair of switches which are selectively connected to said deemphasis network output of said stereo-demodulator and of said other branch respectively.

References Cited in the file of this patent

UNITED STATES PATENTS 1,914,570 Jenkins ---------------- June 20, 1933

FOREIGN PATENTS 120,269 Australia -------------- Aug. 23, 1945